US009122350B2

(12) United States Patent
Kao et al.

(10) Patent No.: US 9,122,350 B2
(45) Date of Patent: Sep. 1, 2015

(54) OPTICAL TOUCH APPARATUS CAPABLE OF DETECTING DISPLACEMENT WITH TWO LIGHT BEAMS AND OPTICAL TOUCH METHOD THEREOF

(71) Applicants: Ming-Tsan Kao, Hsin-Chu (TW); Hui-Hsuan Chen, Hsin-Chu (TW); Tien-Chia Liu, Hsin-Chu (TW); Hsin-Chia Chen, Hsin-Chu (TW)

(72) Inventors: Ming-Tsan Kao, Hsin-Chu (TW); Hui-Hsuan Chen, Hsin-Chu (TW); Tien-Chia Liu, Hsin-Chu (TW); Hsin-Chia Chen, Hsin-Chu (TW)

(73) Assignee: PIXART IMAGING INCORPORATION, R.O.C., Hsin-Chu (TW)

( * ) Notice: Subject to any disclaimer, the term of this patent is extended or adjusted under 35 U.S.C. 154(b) by 88 days.

(21) Appl. No.: 13/776,118

(22) Filed: Feb. 25, 2013

(65) Prior Publication Data

US 2013/0241884 A1    Sep. 19, 2013

(30) Foreign Application Priority Data

Mar. 16, 2012  (TW) .............................. 101108993 A (51) Int. Cl.
*G06F 3/0354* (2013.01)
*G06F 3/042* (2006.01)
*G06F 3/03* (2006.01)

(52) U.S. Cl.
CPC ............ *G06F 3/0421* (2013.01); *G06F 3/0317* (2013.01); *G06F 3/0425* (2013.01); *G06F 2203/04109* (2013.01)

(58) Field of Classification Search
CPC ... G06F 3/0354; G06F 3/03543; G06F 3/033; G06F 3/0485

USPC .......... 345/156–160, 163–166; 715/856–858; 463/37
See application file for complete search history.

(56) References Cited

U.S. PATENT DOCUMENTS

| 6,456,275 | B1 | 9/2002 | Hinckley et al. | |
|---|---|---|---|---|
| 7,399,953 | B2 * | 7/2008 | Xie et al. | 250/221 |
| 7,489,532 | B2 | 2/2009 | Shih | |
| 7,808,478 | B2 | 10/2010 | Choi et al. | |
| 2004/0008528 | A1 | 1/2004 | Umemoto et al. | |
| 2008/0266251 | A1 * | 10/2008 | Chao et al. | 345/157 |
| 2009/0167723 | A1 * | 7/2009 | Kwong et al. | 345/175 |
| 2009/0315397 | A1 | 12/2009 | Udo | |
| 2011/0102319 | A1 * | 5/2011 | Lin et al. | 345/158 |

FOREIGN PATENT DOCUMENTS

| CN | 101004644 A | 7/2007 |
|---|---|---|
| TW | 200608184 A | 8/2004 |
| TW | 201013471 A | 9/2008 |
| TW | 201013472 A | 9/2008 |
| TW | I425755 B | 2/2014 |

* cited by examiner

*Primary Examiner* — Ram Mistry
(74) *Attorney, Agent, or Firm* — Tung & Associates (57) ABSTRACT

An optical touch apparatus includes a first light source, a second light source, a light guide device, a light reflecting device and an image sensing module. The first light source emits first light beam which travels within the light guide device and is reflective by an object close to or in contact with a surface of the light guide device to become a first image light beam. The first image light beam is reflected by a light reflecting device. The image sensing module receives the first image light beam. The second light source emits a second light beam, wherein when the optical touch apparatus moves on a working surface, the second light beam is reflective by the working surface to form a second image light beam which is received by the same image sensing module.

11 Claims, 8 Drawing Sheets

OPTICAL TOUCH APPARATUS CAPABLE OF DETECTING DISPLACEMENT WITH TWO LIGHT BEAMS AND OPTICAL TOUCH METHOD THEREOF

CROSS REFERENCE

The present invention claims priority to TW 101108993, filed on Mar. 16, 2012.

BACKGROUND OF THE INVENTION

1. Field of Invention

The present invention relates to a touch apparatus and a touch method; particularly, it relates to an optical touch apparatus and an optical touch method.

2. Description of Related Art

With the rapid development of the computer industry, the conventional mechanic mouse using a wheel has been replaced by the optical mouse using an optical sensor. Although the mechanic wheel mouse is inexpensive and operates by a very simple principle, dust and dirt tend to enter into the roller to cause malfunction. Therefore, it is required to clean the inside of the mouse frequently, which is inconvenient in use.

Because the technology for manufacturing the optical mouse is mature and the price of the optical mouse is affordable, the optical mouse has replaced the conventional wheel mouse to become the consumer's priority choice of the mouse. The optical mouse does not need cleaning and is abrasion-resistant. In addition, unlike the wheel mouse, the optical mouse does not use mechanical components which lose accuracy as time goes on. Accordingly, the optical mouse has become an inevitable trend in the mouse market.

In addition, the touch-sensing mouse provides users with a more intuitive human-machine interface, which allows users to input commands according to the gestures of the finger object, as referring to the capacitive touch control of U.S. Pat. No. 7,808,478 and the optical touch control of U.S. Pat. No. 6,456,275.

SUMMARY OF THE INVENTION

The present invention provides an optical touch apparatus having functions of optical touch control and displacement detection.

The present invention provides an optical touch method, which is applicable in the above-mentioned optical touch apparatus.

Other objectives and advantages of the present invention can be understood from the disclosure of the specification.

To achieve one or more of the above and other objectives, from one perspective, the present invention provides an optical touch apparatus. The optical touch apparatus comprises a first light source, a light guide device, a light reflecting device, an image sensing module and a second light source. The first light source is used for emitting a first light beam. The light guide device is disposed in a transmission path of the first light beam. The light guide device comprises a first surface, a second surface opposite to the first surface, and a side surface connecting the first surface and the second surface. The first light beam enters the light guide device through the side surface, wherein the first light beam traveling within the light guide device is reflective by an object close to or in contact with the first surface so as to be converted to a first image light beam emitting out from the second surface. The image sensing module is used for receiving the first image light beam and is disposed in a reflection transmission path of the first image light beam reflected by the light reflecting device. The second light source is used for emitting a second light beam, wherein when the optical touch apparatus moves on a working surface, the second light beam is reflective by the working surface to form a second image light beam which is received by the image sensing module.

In one embodiment, the image sensing module includes an optical sensor device for receiving the first image light beam and the second image light beam.

In one embodiment, the first image light beam and the second image light beam transmitted to the image sensing module partially overlap with each other or do not overlap with each other.

In one embodiment, the optical touch apparatus further comprises a first housing. The first housing is disposed in the transmission path or the reflection transmission path of the first image light beam and also in a transmission path of the second image light beam. The first housing includes an inner space and at least one opening, wherein the image sensing module is disposed in the inner space, and the image sensing module has a sensing surface facing the opening so as to receive the first image light beam and the second image light beam.

In one embodiment, the first housing includes a first opening and a second opening, wherein the first opening is disposed in the transmission path or the reflection transmission path of the first image light beam, and the second opening is disposed in the transmission path of the second image light beam.

In one embodiment, the image sensing module includes a first optical sensor device for receiving the first image light beam and a second optical sensor device for receiving the second image light beam.

In one embodiment, the first optical sensor device has a first sensing surface facing the working surface and the second optical sensor device has a second sensing surface facing the working surface.

In one embodiment, the optical touch apparatus further comprises a second housing, which accommodates the first light source, the light guide device, the light reflecting device, the image sensing module and the second light source. The second housing includes a first surface and a second surface opposite to the first surface. The light guide device is disposed close to the first surface of the housing, and the light reflecting device is disposed close to the second surface of the housing, and the image sensing module has a sensing surface facing the second surface of the housing.

In one embodiment, the light reflecting device includes a converging mirror, a plane mirror or a convex mirror.

In one embodiment, the optical touch apparatus further comprises a light source control module and a processing unit. The light source control module is electrically connected to the first light source and the second light source to control intensities and timings of the first light beam emitted from the first light source and the second light beam emitted from the second light source, respectively. The processing unit is used for determining whether to detect a displacement of the optical touch apparatus on the working surface or to detect a movement of the object on or above the first surface of the light guide device according to image signals captured by the image sensing module.

In one embodiment, the optical touch apparatus further comprises a transmission unit, wherein the transmission unit is coupled to the processing unit, for outputting a result of detecting the displacement of the optical touch apparatus on the working surface or a result of detecting a movement of the object on or above the first surface of the light guide device.

In one embodiment, the optical touch apparatus further comprises an acceleration sensing unit, wherein the acceleration sensing unit is used for detecting a displacement of the optical touch apparatus on the working surface.

From another perspective, the present invention provides an optical touch method for use in the above-mentioned optical touch apparatus. The optical touch method comprises the following steps. First, the second light source emits the second light beam and the image sensing module captures image signals. Next, it is determined whether to detect a displacement of the optical touch apparatus on the working surface or to detect a movement of the object on or above the first surface of the light guide device according to the image signals captured by the image sensing module. When it is determined that there is a displacement of the optical touch apparatus on the working surface, a detection result of the displacement of the optical touch apparatus is outputted. When it is determined that there is no displacement of the optical touch apparatus on the working surface, the first light source emits the first light beam and the image sensing module captures image signals to detect the movement of the object on or above the first surface of the light guide device; a detection result of the movement of the object is outputted.

From yet another perspective, the present invention provides an optical touch method for use in the above-mentioned optical touch apparatus. The optical touch method comprises the following steps. First, it is determined whether the optical touch apparatus moves on the working surface by the acceleration sensing unit. When the acceleration sensing unit detects and finds that the optical touch apparatus moves on the working surface, the second light source emits the second light beam and the image sensing module captures image signals. Next, detecting a displacement of the optical touch apparatus on the working surface according to image signals captured by the image sensing module so as to output a detection result of the displacement of the optical touch apparatus. When the acceleration sensing unit does not find that the optical touch apparatus moves on the working surface, the first light source emits the first light beam and the image sensing module captures image signals. Next, a movement of the object on or above the first surface of the light guide device is detected according to image signals captured by the image sensing module, so as to output a detection result of the movement of the object.

From still another perspective, the present invention provides an optical touch apparatus having a top surface and a bottom surface. The optical touch apparatus comprises a first light source, a light reflecting device, an image sensing module and a second light source. The first light source is used for emitting a first light beam toward the top surface, wherein the first light beam is reflective by an object close to or in contact with the top surface so as to be converted to a first image light beam emitting toward the bottom surface. The light reflecting device is disposed in a transmission path of the first image light beam to reflect the first image light beam. The image sensing module is used for receiving the first image light beam and is disposed in a reflection transmission path of the first image light beam reflected by the light reflecting device. The second light source is used for emitting a second light beam toward the bottom surface, wherein when the optical touch apparatus moves on a working surface, the second light beam is reflective by the working surface to form a second image light beam which is received by the image sensing module.

In view of the above, the present invention possesses the following advantages and features. First, the present invention employs the light guide plate and the light reflecting device, so that a first image light beam carrying the touch control information and a second image light beam carrying the displacement information of the optical touch apparatus can be transmitted to the same image sensing module. The displacement of the optical touch apparatus on the working surface and the movement of the object on or above the first surface of the light guide device can be individually or simultaneously detected by processing the image signals captured by the image sensing module. That is, the optical touch apparatus can provide both the touch control and the displacement detection functions. In some embodiments, the optical touch apparatus can provide the touch control and the displacement detection functions by employing only one optical sensor device.

In addition, when there are plural optical sensor devices (e.g., two optical sensor devices), their sensing surfaces can be arranged to face the same surface such as the working surface by arranging the transmission paths of the light. Thus, these optical sensor devices can be manufactured on the same substrate or assembled in the same module (e.g., a housing), which not only reduces the manufacturing cost but also decreases the required volume.

The objectives, technical details, features, and effects of the present invention will be better understood with regard to the detailed description of the embodiments below with reference to the accompanying drawings.

DESCRIPTION OF THE PREFERRED EMBODIMENTS

The above and other technical details, features and effects of the invention will be better understood with regard to the detailed description of the embodiments below with reference to the accompanying drawings. In the description, the words relate to directions such as "on", "below", "left", "right", "forward", "backward", etc. are used to illustrate relative orientations in the drawings and should not be considered as limiting in any way.

Figure 1:
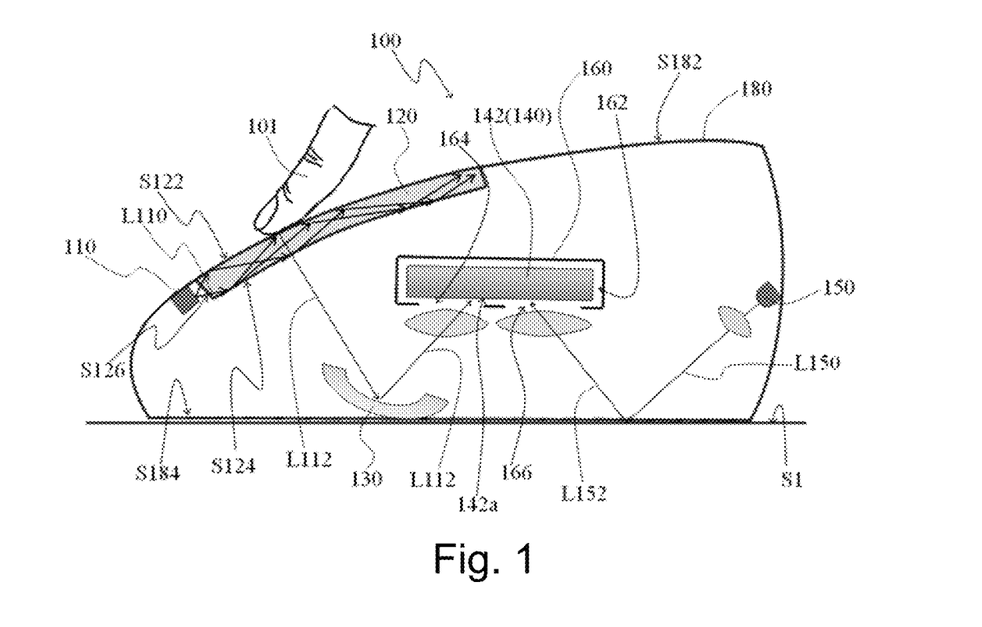
FIG. 1 shows a schematic view of an optical touch apparatus according to an embodiment of the present invention.
Figure 2A:
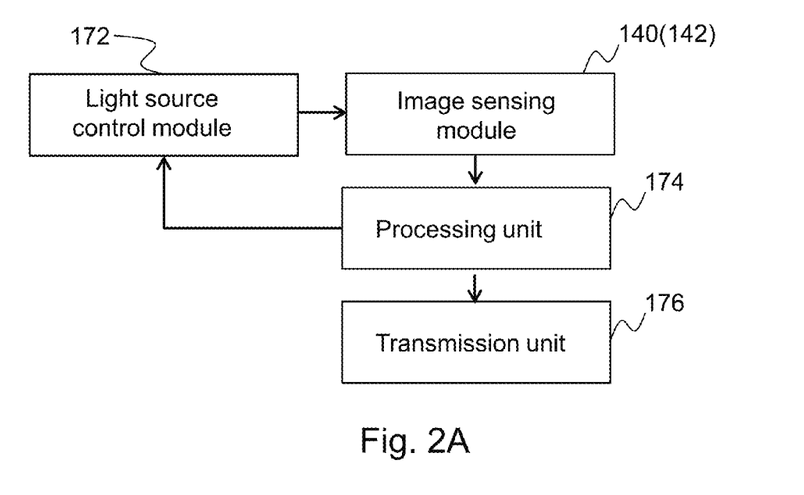
FIG. 2A is a control block diagram of the optical touch apparatus of FIG. 1.

FIG. 1 shows a schematic view of an optical touch apparatus according to an embodiment of the present invention. FIG. 2A is a control block diagram of the optical touch apparatus of FIG. 1. Referring both to FIG. 1 and FIG. 2A, the optical touch apparatus 100 of this embodiment comprises a first light source 110, a light guide device 120, a light reflecting device 130, an image sensing module 140, and a second light source 150. The first light source 110 is used for emitting a first light beam L110. In this embodiment, the first light source 110 is for example a light emitting diode, but the first light source 110 can be any other appropriate light emitting device in other embodiments. In addition, the wavelength of the first light beam L110 can be determined by the design. In this embodiment, the first light beam L110 is for example an invisible light beam (e.g., infrared wavelength), but it can be of any other appropriate wavelength (e.g., a wavelength of visible light).

Referring again to FIG. 1 and FIG. 2A, the light guide device 120 is disposed in a transmission path of the first light beam L110. The light guide device 120 comprises a first surface S122, a second surface S124 opposite to the first surface S122, and a side surface S126 connecting the first surface S122 and the second surface S124. Specifically, the light guide device 120 of this embodiment is for example an edge-type light guide plate having an edge light entrance, wherein the edge-type light guide plate can be a flat-type light guide plate or a wedge-type light guide plate. In this embodiment, an edge-type flat light guide plate is shown as an example, but it is also practicable to use a wedge-type light guide plate in other embodiments. As shown in FIG. 1, the first light beam L110 enters the light guide device 120 through the side surface S126 because the light guide device 120 is an edge-type light guide plate. As such, the first light beam L110 traveling within the light guide device 120 is reflective by an object 101 close to or in contact with the first surface S122 so as to be converted to a first image light beam L112 emitting out from the second surface S124 (as shown in FIG. 1).

In addition, since the light reflecting device 130 is disposed in a transmission path of the first image light beam L112 to reflect the first image light beam L110, the image sensing module 140, which is disposed in a reflection transmission path of the reflected first image light beam L110 reflected by the light reflecting device 130, receives the first image light beam L112. In this embodiment, the image sensing module 140 includes for example an optical sensor device 142. If an object 101 is close to or in contact with the first surface S122 of the light guide device 120, image signals of the object 101 will be detected and captured by the optical sensor device 142 of the image sensing module 140 (as shown in FIG. 1). As such, the optical touch apparatus 100 of this embodiment is capable of providing optical touch control functions (such as gesture control, click control, or cursor control, etc.) by capturing the motion images generated by the object 101. In this embodiment, the light reflecting device 130 is for example but not limited to a converging mirror, but it can be any other light reflecting device in other embodiments such as but not limited to a plane mirror or a convex mirror.

In addition, the second light source 150 is used for emitting a second light beam L150, wherein when the optical touch apparatus 100 moves on a working surface S1, the second light beam L150 is reflective by the working surface S1 to form a second image light beam L152 which is received by the optical sensor device 142 of the image sensing module 140. That is, when a user moves the optical touch apparatus 100 on the working surface Si, the image of the working surface S1 which changes along with the displacement of the optical touch apparatus 100 is detected and captured by the optical sensor device 142 of the image sensing module 140 (as shown in FIG. 1). As such, the optical touch apparatus 100 of this embodiment is capable of providing an optical control function (such as cursor control) by the image change of the working surface S1 due to the displacement of the optical touch apparatus 100. In this embodiment, the second light source 150 is for example a light emitting diode, but the second light source 150 can be any other appropriate light emitting device in other embodiments. In addition, the wavelength of the second light beam L150 can be determined by the design. In this embodiment, the second light beam L150 is for example an invisible light beam (e.g., infrared wavelength), but it can be of any other appropriate wavelength (e.g., a wavelength of visible light).

Figure 2B:
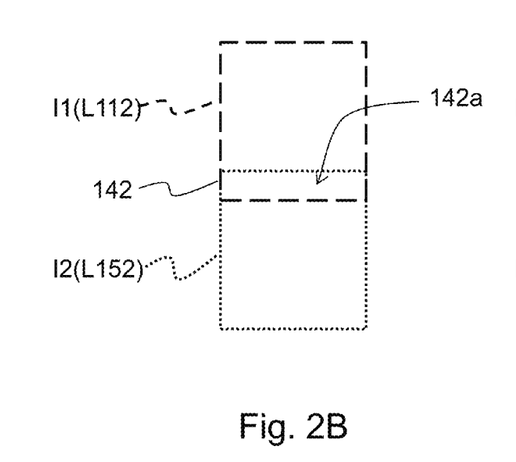
FIG. 2B and FIG. 2C show different situations of the first image light beam and the second image light beam on an optical sensor device according to different embodiments of the present invention.
Figure 2C:
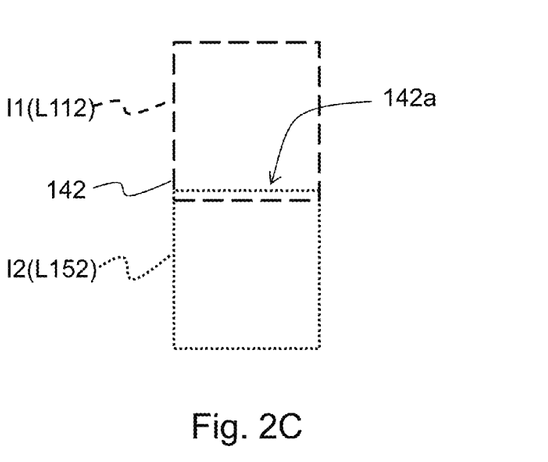

Note that the first image light beam L112 and the second image light beam L152 transmitted to the optical sensor device 142 can partially overlap with each other or do not overlap with each other, as shown in FIG. 2B and FIG. 2C. More specifically, FIG. 2B illustrates that the first image light beam L112 and the second image light beam L152 transmitted to the optical sensor device 142 partially overlap with each other. The first image light beam L112 has a first image region I1 formed on the sensing surface 142a of the optical sensor device 142 and the second image light beam L152 has a second image region I2 formed on the sensing surface 142a of the optical sensor device 142, wherein the first image region I1 and the second image region I2 partially overlap with each other (as shown in FIG. 2B). However, if the angle of the incident light is appropriately designed, the first image light beam L112 and the second image light beam L152 transmitted to the optical sensor device 142 will not overlap with each other(as shown in FIG. 2C).

In the optical touch apparatus 100 of this embodiment, since the image sensing module 140 is disposed in the transmission path or the reflection transmission path of the first image light beam L112 and also in a transmission path of the second image light beam L152, it is possible to detect object touching and to detect a displacement of the optical touch apparatus 100 individually or simultaneously according to the images (e.g., the above-mentioned first image region I1 and second image region I2) captured by the image sensing module 140, to individually or simultaneously perform a click control and a cursor control. With regard to the determination of whether to perform touch control or to detect a displacement of the optical touch apparatus 100, this will be explained in more detail later.

In order for the first image light beam L112 and the second image light beam L152 to be transmitted to the image sensing module 140, the optical touch apparatus 100 may further comprise a housing 160, wherein the housing 160 is disposed in the transmission path or the reflection transmission path of the first image light beam L112 and also in a transmission path of the second image light beam L152. The housing 160 includes an inner space 162, a first opening 164 and a second opening 166 (as shown in FIG. 1). The image sensing module 140 is disposed in the inner space 162. The image sensing module 140 has a sensing surface 142a facing the first opening 164 and the second opening 166 so as to receive the first image light beam L112 and the second image light beam L152. More specifically, the first opening 164 is disposed in the transmission path or the reflection transmission path of the first image light beam L112, and the second opening 166 is disposed in the transmission path of the second image light beam L152 (as shown in FIG. 1). In this embodiment, the housing 160 can be a non-transparent housing so as to prevent stray light from entering the inner space 162. Thus, the image quality formed on the optical sensor device 142 of the image sensing module 140 by the first image light beam L112 and the second image light beam L152 will not be affected by the stray light.

In this embodiment, the optical touch apparatus 100 further comprises a light source control module 172 and a processing unit 174, in order to control the intensities and timings of the light emitted from the first light source 110 and the light emitted from the second light source 150, and to process the images formed on the optical sensor device 142 (as shown in FIG. 2). The light source control module 172 is electrically connected to the first light source 110 and the second light source 150 to control the timing, duration and intensity of the light emitted from the first light source 110 and from the second light source 150, respectively. For example, the first light source 110 will be turned ON if it is intended to sense the touch of the object 101. Likewise, the second light source 150 will be turned ON if it is intended to sense the displacement of the optical touch apparatus 100 on the working surface. In addition, the processing unit 174 determines whether to detect a displacement of the optical touch apparatus 100 on the working surface S1 or to detect a movement indicating a touch control input of the object 101 on the first surface S122 of the light guide device 120 according to image signals captured by the image sensing module 140, wherein the movement includes in-plane movement or hovering movement. The optical touch apparatus 100 may further comprise a transmission unit 176 coupled to the processing unit 174, for outputting either a detection result of the displacement of the optical touch apparatus 100 on the working surface S1 or a detection result of a movement of the object 101 on the first surface S122 of the light guide device 120, which is transmitted to a display device (not shown), for example for cursor control, click control or gesture control.

In this embodiment, the optical touch apparatus 100 further comprises a housing 180, which accommodates the first light source 110, the light guide device 120, the light reflecting device 130, the image sensing module 140 and the second light source 150. The housing 180 includes a first surface S182 and a second surface S184 opposite to the first surface S182. The light guide device 120 is disposed close to the first surface S182 of the housing 180 and the light reflecting device 130 is disposed close to the second surface S184 of the housing 180. The image sensing module 140 has a sensing surface 142a facing the second surface S184 of the housing 180 (as shown in FIG. 1).

In view of the above, the optical touch apparatus 100 of this embodiment employs the light guide plate 120 and the light reflecting device 130, so that the first image light beam L112 carrying the touch control information and the second image light beam L152 carrying the displacement information of the optical touch apparatus 100 can be transmitted to the image sensing module 140. The displacement of the optical touch apparatus 100 on the working surface S1 and the movement of the object 101 on the first surface S122 of the light guide device 120 can be individually or simultaneously detected by processing the image signals captured by the image sensing module 140. That is, the optical touch apparatus 100 of this embodiment can perform both optical touch control function and displacement detection function. Note that the optical touch apparatus 100 of this embodiment is capable of performing both optical touch control function and displacement detection function by only one optical sensor device.

Figure 3:
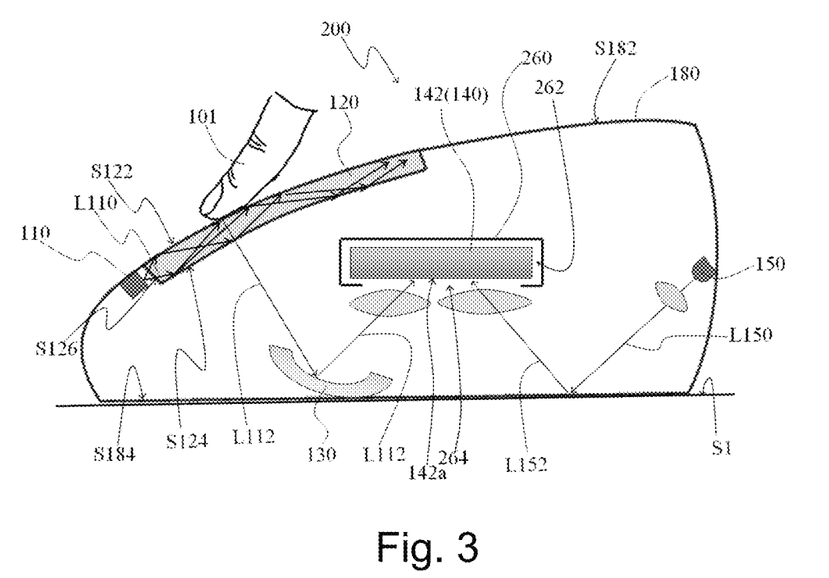
FIG. 3 shows a schematic view of an optical touch apparatus according to another embodiment of the present invention.

FIG. 3 shows a schematic view of an optical touch apparatus according to another embodiment of the present invention. Referring both to FIG. 1 and FIG. 3, the optical touch apparatus 200 of this embodiment is substantially the same as the optical touch apparatus 100 of the first embodiment, but is different in that the housing 260 of the optical touch apparatus 200 includes only one opening 264, wherein both the first image light beam L112 and the second image light beam L152 pass through the opening 264 to be transmitted to the image sensing module 140. The optical touch apparatus 200 of this embodiment operates according to substantially the same mechanism as the optical touch apparatus 100 of the first embodiment, so it has substantially the same advantages and efficacies as the optical touch apparatus 100, which are not redundantly repeated here.

Figure 4:
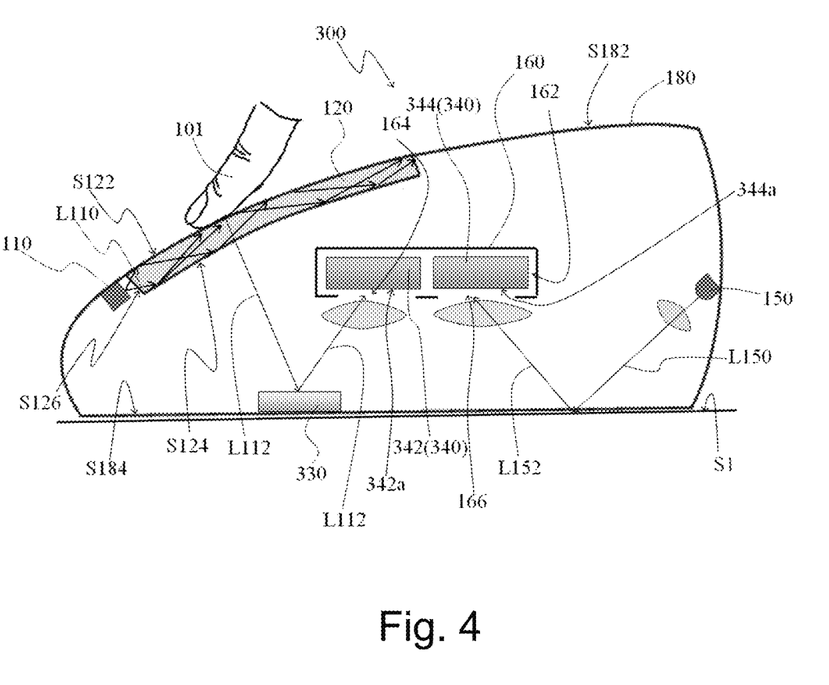
FIG. 4 shows a schematic view of an optical touch apparatus according to yet another embodiment of the present invention.

FIG. 4 shows a schematic view of an optical touch apparatus according to yet another embodiment of the present invention. Referring both to FIG. 1 and FIG. 4, the optical touch apparatus 300 of this embodiment is substantially the same as the optical touch apparatus 100 of the first embodiment, but is different in that the image sensing module 340 of the optical touch apparatus 300 includes a first optical sensor device 342 and a second optical sensor device 344. The first image light beam L112 passes through the opening 164 to be transmitted to the first optical sensor device 342. The second image light beam L152 pass through the opening 166 to be transmitted to the second optical sensor device 344. The first optical sensor device 342 has a first sensing surface 342a facing the second surface S184 of the housing 180 so as to receive the first image light beam L112. The second optical sensor device 344 has a second sensing surface 344a facing the second surface S184 of the housing 180 so as to receive the second image light beam L152. The light reflecting device 330 of the optical touch apparatus 300 is shown for example as a plane mirror, but it is not limited thereto and can be any other light reflecting device, such as a light reflecting sheet. The optical touch apparatus 300 of this embodiment operates according to substantially the same mechanism as the optical touch apparatus 100 of the first embodiment, so it has substantially the same advantages and efficacies as the optical touch apparatus 100, which are not redundantly repeated here.

Figure 5:
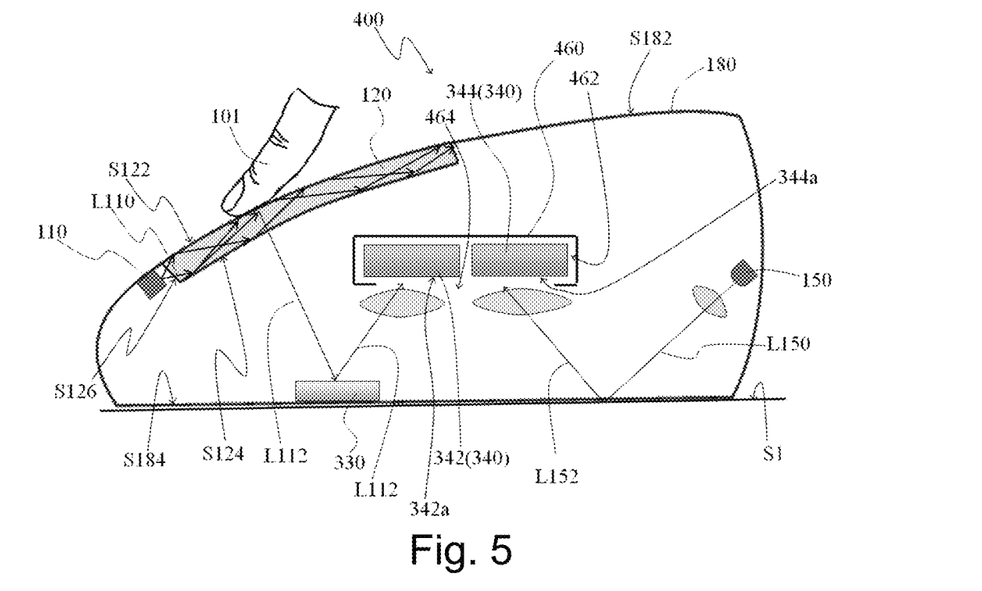
FIG. 5 shows a schematic view of an optical touch apparatus according to still another embodiment of the present invention.

FIG. 5 shows a schematic view of an optical touch apparatus according to still another embodiment of the present invention. Referring both to FIG. 4 and FIG. 5, the optical touch apparatus 400 of this embodiment is substantially the same as the above-mentioned optical touch apparatus 300, but is different in that the housing 460 of the optical touch apparatus 400 includes only one opening 464, wherein both the first image light beam L112 and the second image light beam L152 pass through the opening 464 to be transmitted to the first optical sensor device 342 and the second optical sensor device 344. The optical touch apparatus 400 of this embodiment operates according to substantially the same mechanism as the above-mentioned optical touch apparatus 300, so it has substantially the same advantages and efficacies as the optical touch apparatus 100, which are not redundantly repeated here.

The present invention also provides an optical touch method, which is applicable in the above-mentioned optical touch apparatus 100, 200, 300, or 400. The optical touch method of this embodiment comprises the steps shown in FIG. 6. However, the present invention is not limited to the sequence of the steps shown in FIG. 6.

Figure 6:
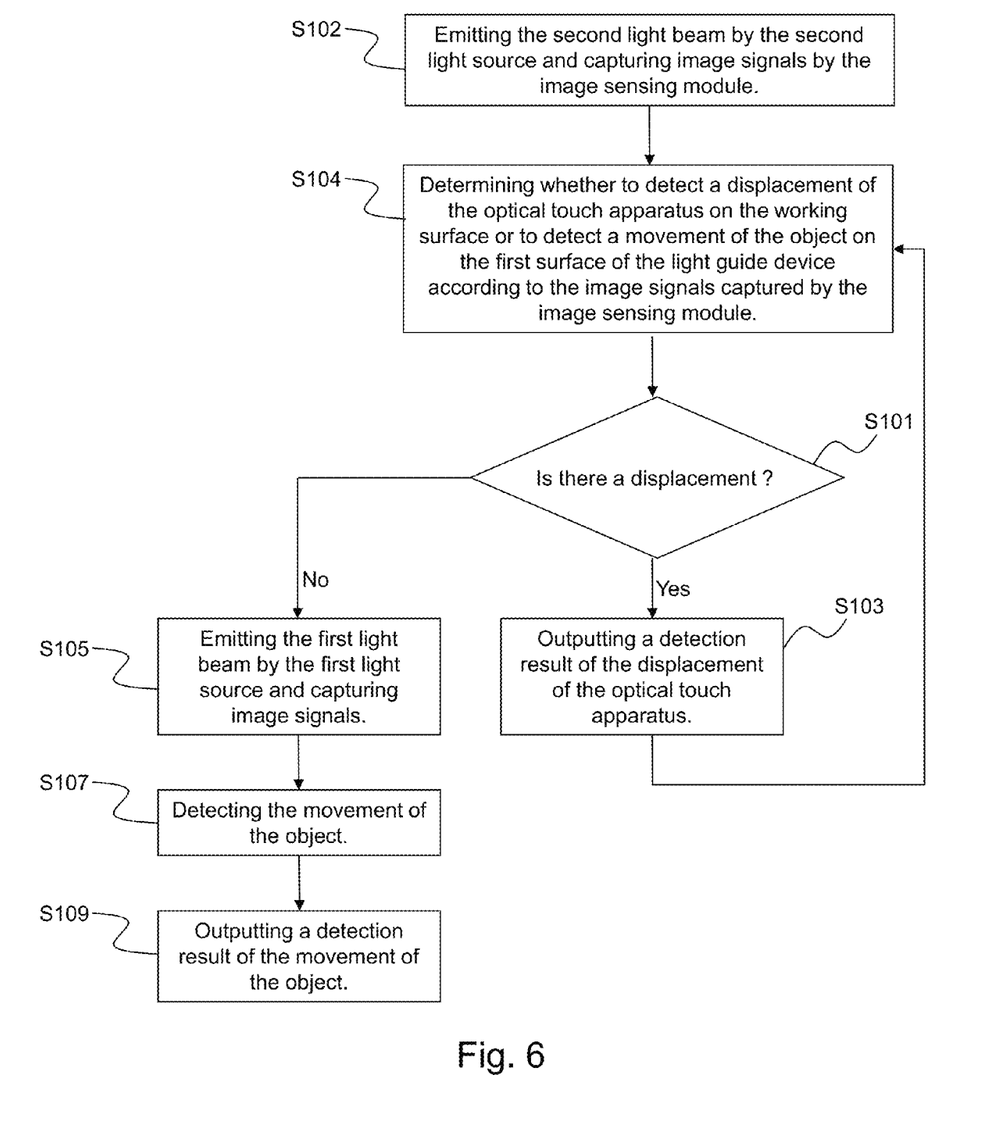
FIG. 6 shows a flowchart of an optical touch method according to an embodiment of the present invention.

First, as shown in the step S102 of FIG. 6, in order not to turn ON the first light source 110 and the second light source 150 at the same time so as to reduce unnecessary power consumption, this embodiment emits the second light beam L150 by the second light source 150 and captures image signals by the image sensing module 140 or the optical sensor device 344.

Next, as shown in the step S104 of FIG. 6, this embodiment determines whether to detect a displacement of the optical touch apparatus 100, 200, 300, or 400 on the working surface S1 or to detect a movement of the object 101 on the first surface S122 of the light guide device 120 according to the image signals captured by the image sensing module 140 or 340 (the optical sensor device 142 or optical sensor devices 342 and 344).

More specifically, as shown in the steps S101 and S103 of FIG. 6, when it is determined that there is a displacement of the optical touch apparatus 100, 200, 300 or 400 on the working surface S1, a detection result of the displacement of the optical touch apparatus 100, 200, 300 or 400 is outputted. As shown in the steps S101, S105, S107, S109 of FIG. 6, when it is determined that there is no displacement of the optical touch apparatus 100, 200, 300 or 400 on the working surface S1, this embodiment emits the first light beam L110 by the first light source 110 and captures image signals by the image sensing module 140 or the first optical sensor device 342 to detect the movement of the object 101 on the first surface S122 of the light guide device 120, and outputs a detection result of the movement of the object 101.

It should be noted that in stead of detecting the displacement of the optical touch apparatus 100, 200, 300 or 400 and the movement of the object 101 according to the above-mentioned steps, the first light source 110 and the second light source 150 may be turned ON at the same time, and the displacement of the optical touch apparatus 100, 200, 300 or 400 and the movement of the object 101 individually or simultaneously in other embodiments.

Figure 7:
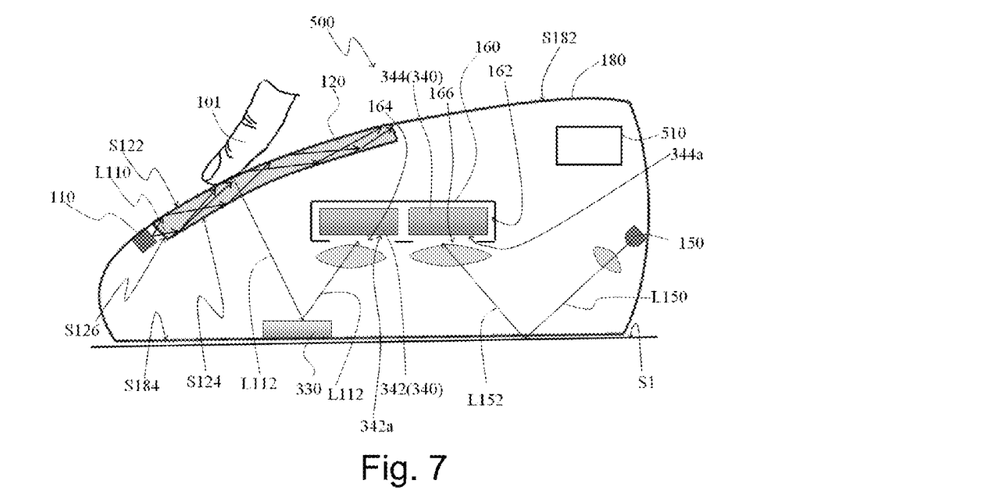
FIG. 7 shows a schematic view of an optical touch apparatus according to a further other embodiment of the present invention.
Figure 8:
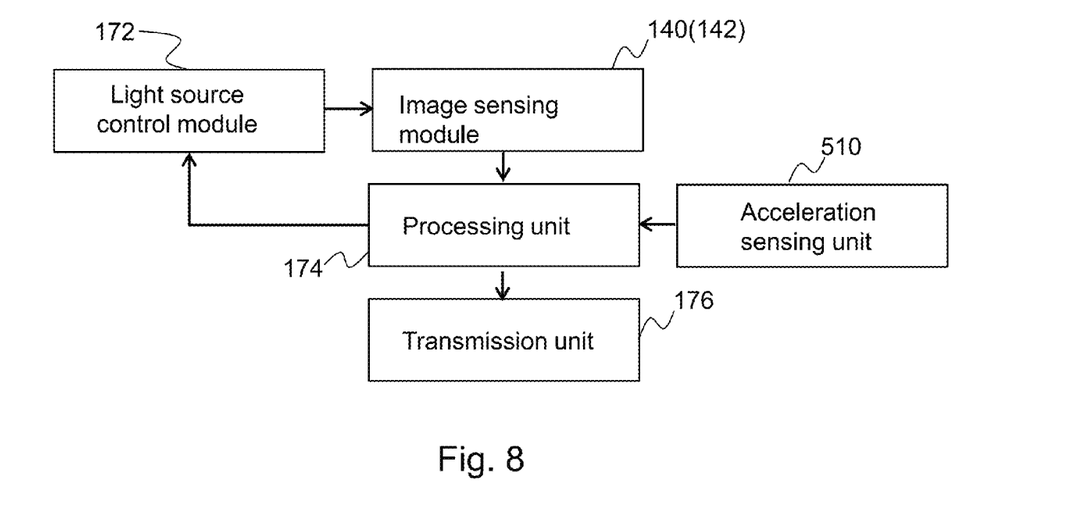
FIG. 8 is a control block diagram of the optical touch apparatus of FIG. 7.

FIG. 7 shows a schematic view of an optical touch apparatus according to still another embodiment of the present invention. FIG. 8 is a control block diagram of the optical touch apparatus of FIG. 7. Referring to FIG. 4, FIG. 7 and FIG. 8, the optical touch apparatus 500 of this embodiment is substantially the same as the above-mentioned optical touch apparatus 300, but is different in that the optical touch apparatus 500 further comprises an acceleration sensing unit 510 for detecting a movement of the optical touch apparatus 500 on the working surface S1. In this embodiment, the acceleration sensing unit 510 can be a one-dimensional acceleration sensing unit or a two-dimensional acceleration sensing unit, and for example is a MEMS sensor unit manufactured by CMOS process. As shown in FIG. 7 and FIG. 8, the optical touch apparatus 500 determines whether the optical touch apparatus 500 moves on the working surface S1 by the acceleration sensing unit 510, and turns ON the second light source 150 to detect the displacement of the optical touch apparatus 500 according to the determination.

In other words, the optical touch apparatus 500 of this embodiment operate according to substantially the same mechanism as the above-mentioned optical touch apparatus 300, except that the optical touch apparatus 500 employs an acceleration sensing unit 510 to detect the displacement of the optical touch apparatus 500, which enhances the detection accuracy. Accordingly, the optical touch apparatus 500 of this embodiment has substantially the same advantages and efficacies as the above-mentioned optical touch apparatus 300, which are not redundantly repeated here. It is noteworthy that the above-mentioned optical touch apparatus 100,200,400 may also employ an acceleration sensing unit 510 and operate according to the above-mentioned mechanism, which is not redundantly repeated here.

The present invention also provides an optical touch method, which is applicable in the above-mentioned optical touch apparatus 500. The optical touch method of this embodiment comprises the steps shown in FIG. 9. However, the present invention is not limited to the sequence of the steps shown in FIG. 9.

Figure 9:
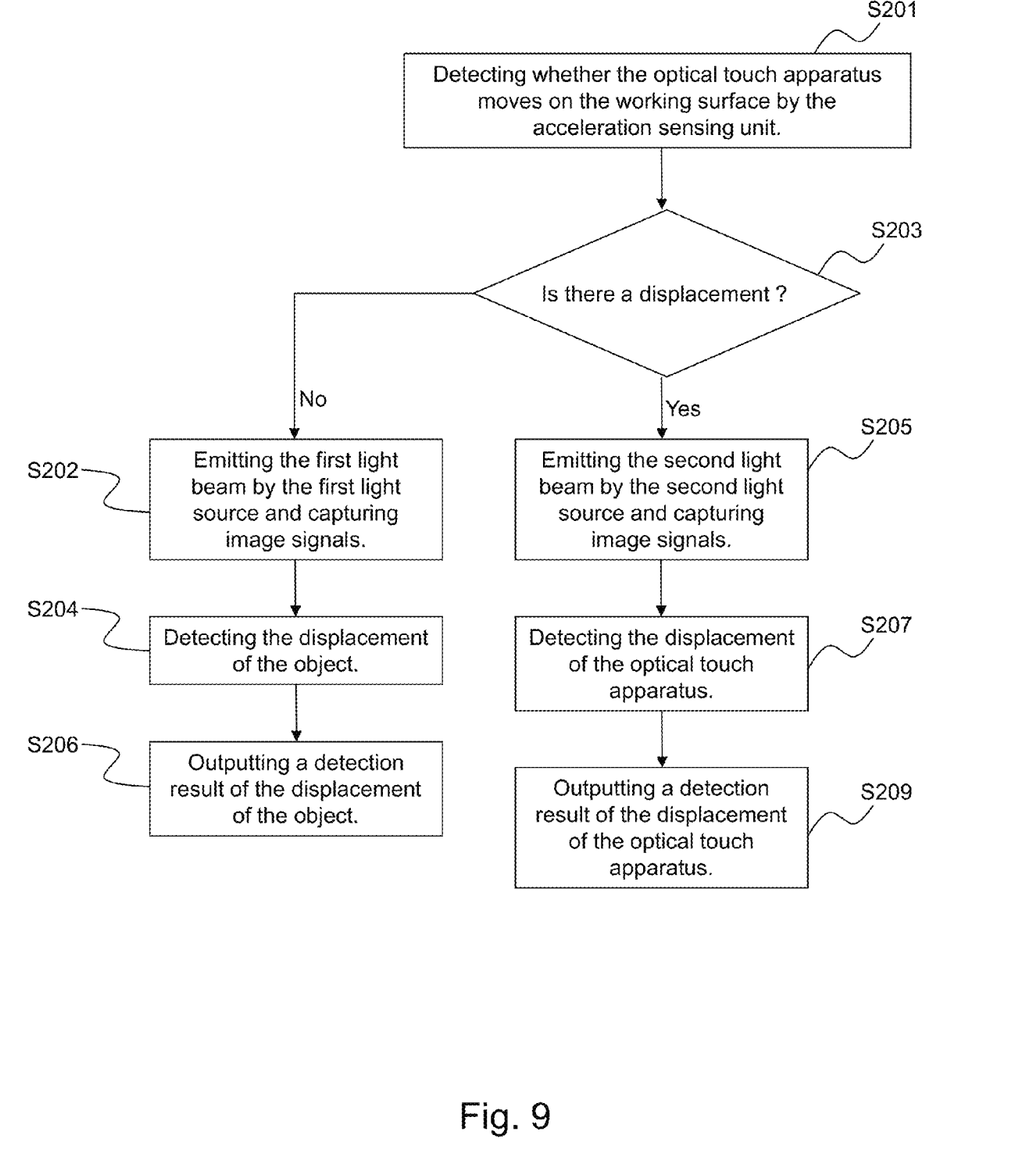
FIG. 9 shows a flowchart of an optical touch method according to another embodiment of the present invention.

First, as shown in the step S201 of FIG. 9, in order not to turn ON the first light source 110 and the second light source 150 at the same time so as to reduce unnecessary power consumption, this embodiment detects whether the optical touch apparatus 500 moves on the working surface S1 by the acceleration sensing unit 510.

Next, as shown in the steps S203 of FIG. 9, this embodiment determines whether the optical touch apparatus 500 moves on the working surface S1 by the acceleration sensing unit 510. If the acceleration sensing unit 510 detects and finds that the optical touch apparatus 500 moves on the working surface S1, this embodiment emits the second light beam L150 by the second light source 150 and captures image signals by the second optical sensor device 344. Next, as shown in the steps S205, S207 and S209 of FIG. 9, this embodiment detects a displacement of the optical touch apparatus 500 on the working surface S1 according to image signals captured by the second optical sensor device 344 so as to output a detection result of the displacement of the optical touch apparatus 500.

As shown in the steps S202 of FIG. 9, if the acceleration sensing unit 510 does not find that the optical touch apparatus 500 moves on the working surface S1, this embodiment emits the first light beam L112 by the first light source 110 and captures image signals by the first optical sensor device 342. Next, as shown in the steps S204 and S206 of FIG. 9, this embodiment detects a movement of the object 101 on the first surface S122 of the light guide device 120 according to image signals captured by the first optical sensor device 342 so as to output a detection result of the movement of the object 101.

Figure 10:
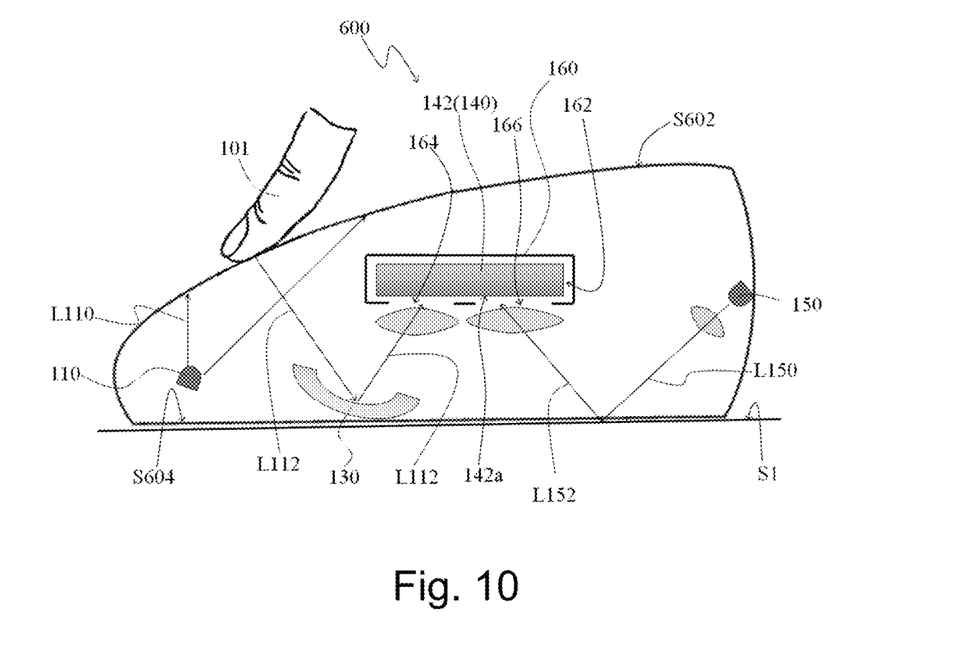
FIG. 10 shows a schematic view of an optical touch apparatus according to still another embodiment of the present invention.

FIG. 10 shows a schematic view of an optical touch apparatus according to still another embodiment of the present invention. Referring both to FIG. 1 and FIG. 10, the optical touch apparatus 600 of this embodiment is substantially the same as the above-mentioned optical touch apparatus 100, but is different in that the optical touch apparatus 600 does not employ a light guide device 120. That is, the first light source 110 emits a first light beam L110 toward a top surface S602 of the optical touch apparatus 600. The optical touch apparatus 600 has a top surface S602 and a bottom surface S604. The above-mentioned first light source 110, light reflecting device 130, image sensing module 140 and second light source 150 are all disposed in the optical touch apparatus 600.

In the optical touch apparatus 600, the first light source 100 is used for emitting a first light beam L110 toward the top surface S602, wherein the first light beam L110 is reflective by an object 101 close to or in contact with the top surface S602 so as to be converted to a first image light beam L112 emitting toward the bottom surface S604. In addition, the light reflecting device 130 is disposed in a transmission path of the first image light beam L112 to reflect the first image light beam L112. The image sensing module 140 is used for receiving the first image light beam L112 and is disposed in a reflection transmission path of the first image light beam L112 reflected by the light reflecting device 130. In addition, the second light source 150 is used for emitting a second light beam L150 toward the bottom surface S604, wherein when the optical touch apparatus 600 moves on a working surface S1, the second light beam L150 is reflective by the working surface S1 to form a second image light beam L152 which is received by a optical sensor device 142 of the image sensing module 140 (as shown in FIG. 10).

In view of the above, the optical touch apparatus 600 of this embodiment operates according to substantially the same mechanism as the optical touch apparatus 100 of the first embodiment operate, except that the optical touch apparatus 600 employs the first light source 110 to emit the first light beam L110 toward the top surface S602 of the optical touch apparatus 600. This embodiment does not employ a light guide device 120, which may save the cost of the light guide device 120. Accordingly, the optical touch apparatus 600 has substantially the same advantages and efficacies as the optical touch apparatus 100 of the first embodiment, which are not redundantly repeated here. This embodiment can determine whether to detect a displacement of the optical touch apparatus 600 or to detect a movement of the object 101 according to the above-mentioned mechanism, which is not redundantly repeated here.

In view of the above, the present invention possesses the following advantages and features. First, the present invention employs the light guide plate and the light reflecting device, so that a first image light beam carrying the touch control information and a second image light beam carrying the displacement information of the optical touch apparatus can be transmitted to the same image sensing module. The displacement of the optical touch apparatus on the working surface and the movement of the object on or above the first surface of the light guide device can be individually or simultaneously detected by processing the image signals captured by the image sensing module. That is, the optical touch apparatus can provide both the touch control and the displacement detection functions. In some embodiments, the optical touch apparatus can provide the touch control and the displacement detection functions by employing only one optical sensor device.

In addition, when there are plural optical sensor devices (e.g., two optical sensor devices), their sensing surfaces can be arranged to face the same surface such as the working surface by arranging the transmission paths of the light. Thus, these optical sensor devices can be manufactured on the same substrate or assembled in the same module (e.g., a housing), which not only reduces the manufacturing cost but also decreases the required volume.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. In view of the foregoing, the spirit of the present invention should cover all such and other modifications and variations, which should be interpreted to fall within the scope of the following claims and their equivalents.

What is claimed is:

1. An optical touch apparatus, comprising:
   a first light source for emitting a first light beam;
   a light guide device disposed in a transmission path of the first light beam, the light guide device comprising a first surface, a second surface opposite to the first surface, and a side surface connecting the first surface and the second surface, the first light beam entering the light guide device through the side surface, wherein the first light beam traveling within the light guide device is reflected by an object close to or in contact with the first surface so as to be converted to a first image light beam emitting out from the second surface;
   a light reflecting device, which is disposed in a transmission path of the first image light beam to reflect the first image light beam;
   an image sensing module for receiving the first image light beam, which is disposed in a reflection transmission path of the first image light beam reflected by the light reflecting device;
   a second light source for emitting a second light beam, wherein when the optical touch apparatus moves on a working surface, the second light beam is reflected by the working surface to form a second image light beam which is received by the image sensing module; and
   a housing disposed in the transmission path or the reflection transmission path of the first image light beam and also in a transmission path of the second image light beam, the housing including an inner space and at least one opening, wherein the image sensing module is disposed in the inner space, and the image sensing module has a sensing surface facing the opening so as to receive the first image light beam and the second image light beam.

2. The optical touch apparatus of claim 1, wherein the image sensing module includes an optical sensor device for receiving the first image light beam and the second image light beam.

3. The optical touch apparatus of claim 1, wherein the first image light beam and the second image light beam transmitted to the image sensing module partially overlap with each other or do not overlap with each other.

4. The optical touch apparatus of claim 1, wherein the housing includes a first opening and a second opening, the first opening being disposed in the transmission path or the reflection transmission path of the first image light beam, the second opening being disposed in the transmission path of the second image light beam.

5. The optical touch apparatus of claim 1, wherein the image sensing module includes a first optical sensor device for receiving the first image light beam and a second optical sensor device for receiving the second image light beam.

6. The optical touch apparatus of claim 5, wherein the first optical sensor device has a first sensing surface facing the working surface and the second optical sensor device has a second sensing surface facing the working surface.

7. The optical touch apparatus of claim 1, wherein the housing accommodates the first light source, the light guide device, the light reflecting device, the image sensing module and the second light source, and wherein the housing includes a first surface and a second surface opposite to the first surface, the light guide device being disposed close to the first surface of the housing, the light reflecting device being disposed close to the second surface of the housing, the image sensing module having the sensing surface facing the second surface of the housing.

8. The optical touch apparatus of claim 1, wherein the light reflecting device includes a converging mirror, a plane mirror or a convex mirror.

9. The optical touch apparatus of claim 1, further comprising:
   a light source control module electrically connected to the first light source and the second light source to control intensities and timings of the first light beam emitted from the first light source and the second light beam emitted from the second light source, respectively; and a processing unit for determining whether to detect a displacement of the optical touch apparatus on the working surface or to detect a movement of the object on or above the first surface of the light guide device according to image signals captured by the image sensing module.

10. The optical touch apparatus of claim 9, further comprising:
a transmission unit coupled to the processing unit, for outputting a result of detecting the displacement of the optical touch apparatus on the working surface or a result of detecting a movement of the object on or above the first surface of the light guide device.

11. The optical touch apparatus of claim 1, further comprising:
an acceleration sensing unit for detecting a movement of the optical touch apparatus on the working surface.

* * * * *